United States Patent Office 3,472,605
Patented Oct. 14, 1969

3,472,605
PROCESS FOR DYEING OR PRINTING LEATHER
Heinz Wicki, Allschwil, Basel-Land, Max May, Basel, and Markus Badertscher, Reinach, Basel-Land, Switzerland, assignors to Sandoz Ltd. (also known as Sandoz A.G.), Basel, Switzerland
No Drawing. Filed July 31, 1964, Ser. No. 386,729
Claims priority, application Switzerland, Aug. 2, 1963, 7,496/64; Mar. 26, 1964, 7,497/64; Apr. 13, 1964, 7,498/64
Int. Cl. D06p 3/32
U.S. Cl. 8—12                                   7 Claims

ABSTRACT OF THE DISCLOSURE

Leather dyed or printed with an impregnating dye preparation having a pH of from 7.5 to 9.5 and containing dye, water, water-soluble higher fatty acid salt, a glycol, at most 50 grams per liter of a polyhydroxyethylated phenol and a saturated liquid hydrocarbon is fast to scratching, is deeply penetrated by the dye and constitutes a level dyeing.

---

Leather is frequently dyed or printed with an aqueous dyestuff preparation containing a surface-active auxiliary, an organic solvent or other auxiliaries. These dyestuff preparations should be suitable for application by brushing, spraying or pouring, but none of them enable the dyestuff to penetrate sufficiently deeply into the leather, so that patchy dyeings are obtained which are not fast enough, especially to scratching.

The present invention is based on the observation that the afore-mentioned shortcomings can be overcome by impregnating leather with a dyestuff preparation that contains a dyestuff, water, and a water-soluble salt of a higher fatty acid. The aqueous dyestuff preparations have the advantage that they can be applied on pouring machines without, or substantially without, adding any thickener and/or film-forming binder. The films poured in this manner are extremely stable.

In this manner all types of leather can be dyed or printed, for example grained leather, buffed leather or splits, suede leather and the flesh side of tanned and dried skins. These leathers may be moist from shaving or dry.

Any one of the known leather dyes may be used, especially disazo and trisazo dyestuffs, metal complex dyestuffs and reactive dyestuffs, that are relatively readily water-soluble, for example those of which are least 10 grams dissolve in a litre of water. It has been observed that, above all, metal complex dyestuffs can be fixed very well on leather so that they do not bleed out in water. Suitable dyestuffs are, for example, those of French specifications 1,073,728, 1,079,152, 1,103,828, 1,138,773 or 1,318,843 or of French patent of Addition 64,596.

Higher fatty acids suitable for use in the present invention are saturated or preferably unsaturated higher aliphatic carboxylic acids containing about 7 to 28, especially 14 to 18, carbon atoms. It is of special advantage to use salts of oleic acid and ammonia or those organic amines that are volatile at room temperature or at a slightly elevated temperature so that favourable rewetting values for pigment dressings are obtained. This favours a good film formation without adversely affecting the wetness properties of the film dressing. Dressings obtained with oleates lend themselves particularly well to glazing. Likewise suitable are the corresponding salts of blown and unblown fatty acids, for example ricinoleic fatty acid. As is known, blown fatty acids are natural, unsaturated fatty acids treated with atmospheric oxygen at an elevated temperature, such as higher aliphatic carboxylic acids containing at least one olefinic double bond. Leathers dyed with their aid are likewise easy to dress. In addition, the dyestuffs easily dissolve in them at room temperature. These salts are used in an amount ranging from about 0.5 to 300 grams and especially from 20 to 150 grams per litre of the dressing liquor. It is of advantage to use a dyestuff preparation that further contains a water-miscible organic solvent boiling within the range from 50° to 200° C.

Water-miscible organic solvents suitable for use in the present process are, for example, nonionic, nitrogenous organic solvents and mixtures thereof, preferably amines or amides, for example acid amides, aminoalcohols, alkylamines and the like; furthermore urea and its derivatives or heterocyclic, nitrogenous compounds. Examples are formamide, methylformamide, ethylformamide, dimethylformamide, diethylformamide, acetamide, urethanes, ethanolamine, diethanolamine, triethanolamine, diethylaminoethanol, thiourea and its derivatives, guanidine and its derivatives, monoisopropylamine, dibutylamine, morpholine and morpholine ethanol. Other suitable solvents are monohydric and polyhydric alcohols, ketones, aldehydes, ethers, acetates, esters, glycols, polyglycols, glycol ethers, glycol esters and alkylenehalides, for example methanol, ethanol, propanol, isopropanol, acetone, methylenechloride, acetonylacetone, formaldehyde, acetaldehyde, 1,4-diethylenedioxide, methyl acetate, ethyl acetate, monobutyl ether, octyl acetate, diethyleneglycol, diethylglycol, ethyleneglycol diethyl ether, ethyleneglycol, hexyleneglycol, dimethoxy tetraglycol, glycerol, diethyleneglycol monobutyl ether, ethyleneglycol monobenzyl ether, ethyleneglycol monoethyl or diethyl ether, ethyleneglycol acetate, ethyleneglycol monomethyl ether, ethyleneglycol monoethyl ether acetate, dipropyleneglycol, tetraethyleneglycol, and triethyleneglycol. The dihydric alcohols are preferred. The proportion of these solvents ranges from about 5 to 980 grams and especially from 30 to 150 grams, preferably from 50 to 100 grams, per litre of dyestuff preparation.

The dyestuff preparations to be used may contain further auxiliaries, for example further organic solvents, conventional anionic or nonionic wetting or dispersing agents, fats, natural or synthetic tanning agents or synthetic resin dispersions and organic or inorganic pigments. Particularly suitable as additional organic solvents are liquid, saturated hydrocarbons, for example liquid petroleum fractions. These additional solvents are used in an amount of up to about 50 grams, especially 1 to 20 g. per litre of dyestuff preparation. Preferred wetting or dispersing agents to be used additionally are sulphonated castor oil or poly-hydroxyethylated phenols, higher amines or alcohols, for example a condensate of a phenol and ethylene oxide, lauryl triglycol ether sulphate or oleyl eikosaglycol ether; these are used in an amount of 0.05 to 50, preferably 1 to 20, grams per litre of the liquid preparation.

The pH values of the above liquors or pastes range in general from 7 to 10, preferably from 7.5 to 9.5. Thus, a dye preparation having a pH within the preferred range may contain (a) a dye, (b) water, (c) a water-soluble salt of a higher fatty acid, (d) a glycol, such as a monoalkylene glycol and a polyalkylene glycol, or a lower alkylene ether, a benzyl ether or a lower alkanoate ester thereof, (e) a condensate of a phenol and polyethyleneoxide in a concentration of at most 50 grams per liter of the dye preparation and (f) a saturated liquid hydrocarbon. The temperature may be room temperature or above. The application may be carried out, for example, by brushing (plush-wheeling), rolling, spraying or with special advantage by pouring, for example with the aid of one of the pouring machines conventionally employed for impregnating or coating leather. The impregnated leather is stored in known manner at room temperature or an elevated temperature, and is then dressed in the usual manner.

Parts and percentages in the following examples are by weight, temperatures are shown in degrees centigrade.

Example 1

A mixture is prepared from 62.5 parts of ricinoleic acid, (known under the designation castor oil fatty acid) 12.5 parts of morpholine, 5 parts of nonylphenylpolyglycolether containing 5 parts of ethylene oxide groups, 60 parts of hexyleneglycol, 40 parts of ethyleneglycol, 10 parts of an odourless petroleum fraction (petrol), 5 parts of 25% aqueous ammonia solution and 10 parts of a 70% aqueous sorbitol solution. 150 parts of this solution—which has a pH value of 8.8—are mixed with 38 parts of the cobalt complex compound of the dye obtained by coupling diazotized 1-hydroxy-2-amino-4-nitrobenzene with 1-hydroxy-2-acetylamino-4-methylbenzene and 812 parts of water.

The above liquor (pH=9.4) is used to impregnate tanned and dried, full-grained leather which is then stored for 1 hour at room temperature (dyed side facing dyed side), ironed at 28% moisture and 180° C., dried and dressed in the usual manner, for example on an ironing or glazing machine.

The dyestuff has penetrated deeply into the leather. The resulting brown dyeing is very level, resists scratching, scrubbing and rubbing, is fast to light, stable towards buffing, formaldehyde and acids.

The ricinoleate used above may be replaced by the corresponding oleate or the ammonium salt of oleic acid. The 10 parts of petrol can be replaced with equal results by 10 parts of lauroyl triglycol ether sulphate or oleyl eikosaglycol ether.

Example 2

A mixture is prepared from 60 parts of oleic acid, 12 parts of morpholine, 5 parts of nonylphenylpolyglycolether containing 5 parts of ethylene oxide groups, 50 parts of hexyleneglycol, 50 parts of ethyleneglycol, 12 parts of an odourless petroleum fraction (petrol), 6 parts of a 25% aqueous ammonia solution and 10 parts of a 70% sorbitol solution. 150 parts of this mixture—which has a pH value of 8.9—are mixed with 40 parts of the cobalt complex compound of the dye obtained by coupling diazotized 1-hydroxy-2-amino-4-nitrobenzene with 1-hydroxy-2-acetylamino-4-methylbenzene, and 810 parts of water.

The above liquor (pH=9.4) is used for impregnating tanned and dried, full-grained leather which is then stored for 1 hour at room temperature (dyed side facing dyed side), ironed at 28% moisture and 180° C., dried and dressed in the usual manner.

The dyestuff has penetrated deeply into the leather. The resulting brown dyeing is very level, resistant to scratching and scrubbing, fast to light, abrasion resistant, stable towards buffing, formaldehyde and acids.

Example 3

A mixture is prepared from 63 parts of oleic acid, 24 parts of a 25% aqueous ammonia solution, 883 parts of water and chromium complex of dye obtained by coupling diazotized 2-amino-1-hydroxybenzene-4-(2'-carboxy-sulphoanilide with 1-(4'-cyano)-phenyl-3-methylpyrazolone.

The above liquor (pH=9.4) is used to impregnate leather tanned with basic chromium sulphate and previously fatted with sulphonated neat's-foot oil. The leather is then stored for 1 hour at room temperature (dyed side facing dyed side), ironed at 28% moisture and 180° C., dried and dressed in the usual manner, for example on an ironing or glazing machine.

The dyestuff has penetrated deeply into the leather. The resulting red dyeing is very level, resistant to scratching and scrubbing, fast to light, abrasion resistant, stable towards buffing, formaldehyde and acids.

Example 4

A mixture is prepared from 32.5 parts of oleic acid, 32.5 parts of ricinoleic acid, 24 parts of a 25% aqueous ammonia solution, 8 parts of an odourless petroleum fraction (petrol), 873 parts of water and 30 parts of the trisazo dye obtained by coupling tetrazotized benzidine with 1-amine-8-hydroxynaphthalene-3,6-disulfonic acid, reacting the thus obtained intermediate with diazotized 1-amino-benzene-3-sulfonic acid, and coupling the thus obtained disazo dye with diethylamino-3-hydroxybenzene.

The above liquor (pH=9.5) is used to impregnate leather first tanned with chromium sulphate and then with vegetable products, which is then stored for 1 hour at room temperature (dyed side facing dyed side), ironed at 28% moisture and 180° C., dried and dressed in the usual manner, for example on an ironing or glazing machine. The dyestuff has penetrated deeply into the leather. The resulting black dyeing is very level, resistant to scratching and scrubbing, fast to light, abrasion resistant, stable towards buffing, formaldehyde and acids.

The method described in Examples 1 to 4 may also be used for dyeing or printing leather that has been prepared by the following tanning and fatting methods:

(a) With chromium salts, for example leather that has first been tanned with chromium sulphate and then with a vegetable tanning agent;

(b) With chromium salts, for example leather that has first been tanned with chromium sulphate and then with a synthetic tanning agent;

(c) With a mixture of chromium and aluminum salts, for example leather that has first been tanned with chromium and aluminum sulphate and then a resin-based tanning substance. Such tanning and fatting methods have been described, for example, in "Einführung in die chemische Technologie der Lederherstellung," H. Loewe, 1959, or in "Leather Manufacture," D. Wooldroffe, 1959, or "Modern Practice in Leather Manufacture," John Arthur Wilson, 1941.

The dyestuffs mentioned above in Examples 1 to 4 may be replaced by any one of the dyestuffs described in the undermentioned Specifications or by a mixture of such dyestuffs:

United States Patents 1,885,609; 2,080,209; 2,202,350; 2,756,225. French specification, 1,073,728. United States Patents, 2,864,814; 2,749,333; 2,821,524; 2,779,757; 2,820,782; 2,789,975; 2,559,330. French specifications, 1,138,773; 1,210,546. United States Patent 3,288,777. French specification 1,253,728. United States Patent 3,133,911. French specification 1,257,953. United States Patent 3,179,650. French specification of additions, 64,596; 68,187; 75,033; 75,771. United States Patent 3,183,224. French specification of additions 77,754; 78,104.. United States Patent 2,120,799.

The preceding patents are directed to dyes which are and dyes which are not fiber-reactive; they are directed to metallized and unmetallized dyes. The dyes are not limited to a single class. Illustrative of the types of non-fiber-reactive dyes are: pyrazole- and naphthyl-azo-diphenyl-azo-phenyl dyes having a sulfonic acid substituent in each nucleus of the diphenyl group; cobalt and copper complexes of 3-nitro-phenyl-azo-phenyl dyes; metal complexes of polyazo dibenzyl- or stilbene-containing dyes; sulfonated 1,4-, 1,5- and 1,8-di-[4-(4'-halophenoxy)phenylamino]anthraquinones; and metallized α-naphthyl-azo-phenyl dyes wherein the phenyl bears a hydroxyalkylaminousulfonyl substituent.

Alternatively, the dyestuffs of Examples 1 to 4 may be replaced by dyestuffs that are capable of forming a chemical bond with the substrate, so-called reactive dyestuffs. Such dyestuffs contain, for example a halotriazine ring or halopyrimidyl residues. To these belong, inter alia, the following dyestuffs:

"Procion-H" and Procion-M" dyestuffs, such as Procion (registered trademark) brilliant red 2BS, described in "Chemisches Zentralblatt," page 12453 [1961], Procion brilliant orange GS, described in "Angewandte Chemie" 73, page 126 [1961] or "Procion" brilliant blue RS, described in "Helvetica Chimica Acta" 44, page 1123 [1961], or the so-called "Cibacron" dyestuffs (registered trademark); these dyestuffs have also been described in "Collection of Czechoslovak Chemical Publications" 25, pages 2794–2797 [1960] and in Ullmann, 14, page 618 [1963]. Furthermore, there may be used so-called "Remazol" dyestuffs (registered trademark), described in "Collection of Czechoslovak Chemical Publications" 27, pages 272–274, [1962]. Furthermore so-called "Levafix" dyestuffs (registered trademark), described in "Collection of Czechoslovak Chemical Publications" 27, pages 274–275 [1962], or Reactive dyestuffs from United States Patent 3,377,336 and French specification 1,319,429 or 1,332,760.

Having thus disclosed the invention what is claimed is:

1. A process for dying or printing leather which comprises impregnating the leather with a dye preparation having a pH of from 7.5 to 9.5 and containing (a) a dye, (b) water, (c) a water-soluble salt of a higher fatty acid, (d) a glycol selected from the group consisting of a monoalkylene glycol, a polyalkylene glycol, and a lower alkylene ether, a benzyl ether or a lower alkanoate ester thereof, (e) a condensate of a phenol and polyethyleneoxide in a concentration of at most 50 grams per liter of the dye preparation and (f) a liquid saturated hydrocarbon.

2. A process according to claim 1 wherein the higher fatty acid is oleic acid.

3. A process according to claim 2 wherein said salt is the salt of oleic acid and ammonia.

4. A process according to claim 2 wherein said salt is the salt of oleic acid and an organic amine selected from the group consisting of one which is volatile at room temperature and one which is volatile at a slightly elevated temperature.

5. A process according to claim 2 wherein the preparation is applied to the leather with the aid of a pouring machine.

6. A process according to claim 1 wherein the concentration of the water-soluble salt is from 20 to 150 grams per liter of the dye preparation.

7. Leather impregnated with a dye preparation having a pH of from 7.5 to 9.5 and containing (a) a dye, (b) water, (c) a water-soluble salt of a higher fatty acid, (d) a glycol selected from the group consisting of a monoalkylene glycol, a polyalkylene glycol, and a lower alkylene ether, a benzyl ether or a lower alkanoate ester thereof, (e) a condensate of a phenol and polyethyleneoxide in a concentration of at most 50 grams per liter of the dye preparation and (f) a liquid saturated hydrocarbon.

References Cited

UNITED STATES PATENTS

| | | | |
|---|---|---|---|
| 1,843,739 | 2/1932 | Schubert | 8—12 |
| 1,970,578 | 8/1934 | Schoeller et al. | 8—93 XR |
| 1,628,160 | 5/1927 | Lamb | 8—12 |
| 2,062,898 | 12/1936 | Moorhouse | 8—62 |
| 2,069,215 | 2/1937 | Chambers | 8—93 XR |
| 2,225,604 | 12/1940 | Lubs et al. | 8—12 XR |
| 2,290,945 | 7/1942 | Dahlen et al. | 8—62 |
| 2,347,712 | 5/1944 | Robinson et al. | 8—94.23 |
| 2,404,769 | 7/1946 | Amick | 8—62 |
| 2,769,748 | 11/1956 | Eckardt et al. | 8—93 XR |
| 2,828,180 | 3/1958 | Sertorio | 8—62 |
| 2,967,751 | 1/1961 | Streck | 8—13 |
| 2,971,458 | 2/1961 | Kumins et al. | 8—62 XR |
| 3,083,069 | 3/1963 | Hirsbrunner et al. | 8—54 |
| 3,112,983 | 12/1963 | Collins | 8—93 XR |

FOREIGN PATENTS

| | | |
|---|---|---|
| 548,062 | 11/1959 | Belgium. |
| 1,073,728 | 3/1952 | France. |
| 1,312,787 | 1/1962 | France. |
| 582,399 | 8/1933 | Germany. |

GEORGE F. LESMES, Primary Examiner

D. LEVY, Assistant Examiner

U.S. Cl. X.R.

8—93, 92, 13, 62

PO-1050
(5/69)

UNITED STATES PATENT OFFICE
CERTIFICATE OF CORRECTION

Patent No. 3,472,605      Dated October 14, 1969

Inventor(s) Heinz Wicki, Max May and Markus Badertscher

It is certified that error appears in the above-identified patent and that said Letters Patent are hereby corrected as shown below:

Column 1, line 51, "are" should read --at--. Column 2, line 51, "20 g." should read --20 g,--. Column 3, line 63, "and chromium" should read --and 30 parts of the chromium--. Column 4, line 69, "droxyalkyl-aminousulfonyl" should read --droxyalkylaminosulfonyl--. Column 5, line 44, "claim 1" should read --claim 2--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents